2,933,499
Patented Apr. 19, 1960

2,933,499

LOWER ALKYL RESERPATE O-(DIALKYL-4-ALKENOXYBENZOATES)

Jacob Szmuszkovicz, Portage Township, Kalamazoo County, and Richard V. Heinzelman, Kalamazoo Township, Kalamazoo County, Mich., assignors to The Upjohn Company, Kalamazoo, Mich., a corporation of Michigan No Drawing. Application March 3, 1958
Serial No. 718,450

11 Claims. (Cl. 260—287)

The present invention is concerned with physiologically active chemical compounds related to reserpine and is more particularly concerned with methyl reserpate O-(dialkyl-4-alkenoxybenzoates) represented by the following formula:

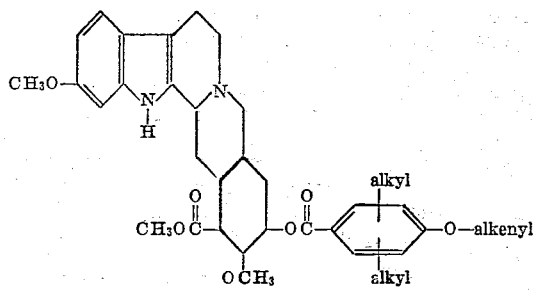

Of particular interest are compounds of the foregoing formula wherein the alkyl radicals and alkenyl radical are the same or different lower-alkyl radicals and lower-alkenyl radical, respectively, the terms lower-alkyl and lower-alkenyl being defined in this specification and appended claims, respectively, as an alkyl radical containing from one to six carbon atoms, inclusive, and an alkenyl radical containing from three to four carbon atoms, inclusive. The methyl reserpate O-(dialkyl-4-alkenoxybenzoates) of this invention are prepared by esterification of methyl reserpate with an esterifying agent to introduce a dialkyl-4-alkenoxybenzoate radical, as more fully illustrated by the examples.

It is an object of the present invention to provide methyl reserpate O-(dialkyl-4-alkenoxybenzoates), particularly the methyl reserpate O-[di-(lower-alkyl)-4-(lower-alkenoxy)-benzoates], which are physiologically active agents of high potency having hypotensive and sedative properties and which have a superior ratio of hypotensive to sedative activity and a superior therapeutic ratio when compared with reserpine. The compounds of the present invention can be substituted for reserpine in known reserpine-containing pharmaceutical compositions such as tablets, injectables, and elixirs. Other objects and uses of the present invention will be apparent to one skilled in the art.

In this invention, representative O-esters of methyl reserpate include the 2,6-dimethyl-4-allyloxybenzoate,
2,6-dimethyl-4-propenoxybenzoate,
2,6-dimethyl-4-(β-butenoxy)-benzoate,
2,6-dimethyl-4-(β-isobutenoxy)-benzoate,
2,6-dimethyl-4-(β-secondary-butenoxy)-benzoate,
2,6-diethyl-4-allyloxybenzoate,
2,6-dibutyl-4-allyloxybenzoate,
2-methyl-6-ethyl-4-allyloxybenzoate, and other 2,6-dialkyl-4-alkenoxybenzoates, the
3,5-dimethyl-4-allyloxybenzoate,
3,5-dimethyl-4-(β-butenoxy)-benzoate,
3,5-diethyl-4-(α-butenoxy)-benzoate,
3,5-dipropyl-4-allyloxybenzoate,
3,5-dihexyl-4-propenoxybenzoate,
3,5-dipropyl-4-(β-isobutenoxy)-benzoate, and other 3,5-dialkyl-4-alkenoxybenzoates, the
2,3-dimethyl-4-allyloxybenzoate,
2,3-dimethyl-4-(β-butenoxy)-benzoate,
2,3-dimethyl-4-(β-secondary-butenoxy)-benzoate,
2-methyl-3-ethyl-4-allyloxybenzoate,
2,3-diisobutyl-4-(β-butenoxy)-benzoate, and other 2,3-dialkyl-4-alkenoxybenzoates, the
2-isopropyl-5-methyl-4-allyloxybenzoate,
2-methyl-5-isopropyl-4-allyloxybenzoate,
2,5-dipropyl-4-allyloxybenzoate,
2,5-dimethyl-4-allyloxybenzoate,
2,5-diethyl-4-propenoxybenzoate,
2-methyl-5-isopropyl-4-(β-butenoxy)-benzoate, and other 2,5-dialkyl-4-alkenoxybenzoates, particularly those dialkyl-4-alkenoxybenzoates wherein the alkyl radicals each contain less than seven carbon atoms and the alkenoxy radical contains from three to four carbon atoms, inclusive, the 2,6-dimethyl-4-alkenoxy-benzoates and 3,5-dipropyl-4-alkenoxybenzoates of this class wherein the alkenoxy radicals are β-alkenoxy radicals in general being more particularly preferred. The 2,6-dimethyl-4-allyloxybenzoate and 3,5-dipropyl-4-allyloxybenzoate esters in general are still more preferred, the most preferred compound being the 3,5-dipropyl-4-allyloxybenzoate ester. It is to be understood that within the scope of this invention are included the methyl reserpate O-(dialkyl-4-alkenoxybenzoate) free base and acid addition salts thereof such as the sulfates, hydrochloride, phosphates, hydrobromide, hydroiodide, acetate, propionate, benzoate, citrates, maleates, succinates, salicylate, phenylacetate, α and β-phenylpropionates, β-cyclopentylpropionate, etc.

In preparing the methyl reserpate O-esters of this invention the preferred esterifying agent is the acid chloride of the dialkyl-4-alkenoxybenzoic acid. However, if desired, the acid bromide, or the acid anhydride, or other dialkyl-4-alkenoxybenzoic acid compound suitable for esterification of methyl reserpate can be employed, all these dialkyl-4-alkenoxybenzoic acid compounds being prepared from the dialkyl-4-alkenoxybenzoic acid by conventional procedures, for example, reaction of a dialkyl-4-alkenoxybenzoic acid with thionyl chloride provides the corresponding dialkyl-4-alkenoxybenzoyl chloride. The dialkyl-4-alkenoxybenzoic acids, in turn, are prepared by prior art procedures or procedures analogous thereto, for example, dialkyl-4-hydroxybenzoic acids (U.S. Patent 2,243,694) are converted, via their esters, to dialkyl-4-alkenoxybenzoic acids by conventional etherification and hydrolysis procedures well-known in the art. The 2,3-dialkyl- and 2,6-dialkyl-4-hydroxybenzoic acids are obtained, for example, by aromatization, such as by heating in the presence of a palladium catalyst, of corresponding 2,3-dialkyl- and 2,6-dialkyl-4-oxo-2-cyclohexene-1-carboxylic acid esters (U.S. Patent 2,582,252 and copending application S.N. 432,033, filed May 24, 1954), followed by hydrolysis of the resulting 2,3-dialkyl- and 2,6-dialkyl-4-hydroxybenzoic acid esters. The 2,5-dialkyl-4-alkenoxybenzoic acids are obtained, for example, by nitration of 1,4-dialkylbenzenes to produce 2-nitro-1,4-dialkylbenzenes, the nitro group then being reduced to an amino group which is diazotized and hydrolyzed to a hydroxy group, and the thus-obtained 2,5-dialkylphenol etherified to produce 2,5-dialkyl-1-alkoxybenzenes which are chloromethylated in the 4-position, the chloromethyl group then converted to a carboxyl group, for example, by alkaline hydrolysis of the chloromethyl group to a hydroxymethyl group followed by oxidation of the hydroxymethyl group to a carboxyl group with potassium permanganate, the alkoxy radical then cleaved, for example, by acid hydrolysis, and the resulting 2,5-dialkyl-4-hydroxybenzoic acid then reetherified, as described above, to introduce a 4-alkenoxy radical. The 3,5-dialkyl-4-alkenoxybenzoic acids are obtained, for example, from 4-chlorophenol by acylation in the 2-position, for example, with an acyl chloride and aluminum chloride according to the Friedel-Crafts acylation method, reduction of the 2-acyl radical to an alkyl radical, for example, with zinc and hydrochloric acid according to the Clemmensen reduction method, acylation, as described above, of the thus-produced 2-alkyl-4-chlorophenol in the 6-position followed by reduction of the acyl radical, as described above, to produce 2,6-dialkyl-4-chlorophenol, elimination of the 4-chloro atom, for example, by treatment with sodium and alcohol, alkylation of the phenolic hydroxyl group to obtain 2,6-dialkyl-1-alkoxybenzene, introduction of a 4-carboxyl radical, for example, by 4-bromination followed by Grignard reagent formation with magnesium and subsequent treatment with carbon dioxide, to obtain 3,5-dialkyl-4-alkoxybenzoic acid which on acid hydrolysis of the 4-alkoxy radical, followed by esterification of the carboxyl group, reetherification of the 4-hydroxy group to introduce a 4-alkenoxy radical, as described above, and hydrolysis of the ester, provides the desired 3,5-dialkyl-4-alkenoxybenzoic acid. 3,5-dialkyl-4-alkenoxybenzoic acids also are obtained by diazotization and acid hydrolysis of the corresponding 3,5-dialkyl-4-aminobenzoic acid followed by etherification, as described above, of the thus-obtained 3,5-dialkyl-4-hydroxybenzoic acid, as its ester, to introduce a 4-alkenoxy radical, and hydrolysis of the ester. The Fries rearrangement of para-unsubstituted dialkylphenol acetates provides dialkyl-4-hydroxyacetophenones which on oxidation of the acetyl group, for example, with potassium permanganate, provide dialkyl-4-hydroxybenzoic acids which are etherified, as described above, to provide the desired dialkyl-4-alkenoxybenzoic acids.

The following examples are illustrative only and are not to be construed as limiting the scope of the present invention.

*Example 1.—Methyl reserpate O-(dialkyl-4-alkenoxybenzoate)—preferred general procedure*

A cold solution of 4.14 grams (0.01 mole) of methyl reserpate in fifty milliliters of pyridine is prepared and 0.03 mole of the dialkyl-4-alkenoxybenzoyl chloride is added thereto during a five-minute period with stirring. The resulting reaction mixture is maintained at room temperature (between about fifteen and about 35 degrees centigrade) for approximately twenty hours. Then the reaction mixture is cooled in an ice bath and a mixture of 100 milliliters of water and fifty grams of ice is added with stirring. The aqueous-organic mixture is extracted with four 50-milliliter portions of chloroform. The combined chloroform extracts are washed with four 50-milliliter portions of five percent aqueous potassium hydroxide solution and the combined aqueous alkaline wash solutions are extracted once with fifty milliliters of chloroform. The combined chloroform solutions then are washed with saturated aqueous sodium chloride solution and dried over anhydrous sodium sulfate. After removal of the drying agent the solution is evaporated to dryness under reduced pressure. The residual crude methyl reserpate O-(dialkyl-4-alkenoxybenzoate) is purified by crystallization and/or chromatographic procedures in a conventional manner.

*Example 2.—Methyl reserpate O-(2,6-dimethyl-4-allyloxy-benzoate)*

Methyl reserpate is esterified with 2,6-dimethyl-4-allyloxybenzoyl chloride according to the general procedure of Example 1. The crude dark brown solid (8.1 grams) obtained is dissolved in thirty milliliters of benzene and chromatographed over 300 grams of neutral alumina. The methyl reserpate O-(2,6-dimethyl-4-allyloxybenzoate) is eluted with benzene containing twelve percent chloroform, and, on evaporation of solvent, the compound is obtained as a yellow powder which does not readily crystallize.

*Example 3.—Methyl reserpate O-[2-methyl-6-ethyl-4-(β-butenoxy)-benzoate]*

Methyl reserpate is esterified with 2-methyl-6-ethyl-4-(β-butenoxy)-benzoyl chloride according to the general procedure of Example 1. The resulting crude product is dissolved in benzene and chromatographed over neutral alumina. The methyl reserpate O-[2-methyl-6-ethyl-4-(β-butenoxy)-benzoate] is eluted with benzene containing ten to fifteen percent chloroform, and, on evaporation of solvent, is obtained as a non-crystalline solid.

*Example 4.—Methyl reserpate O-(3,5-dipropyl-4-allyloxybenzoate)*

Following the general procedure of Example 1 methyl reserpate is esterified with 3,5-di-(n-propyl)-4-allyloxybenzoyl chloride (a special method for the production of the corresponding acid is described in copending application Serial No. 603,236, filed August 10, 1956) to produce twelve grams of crude methyl reserpate O-(3,5-dipropyl-4-allyloxybenzoate). The compound, dissolved in benzene, is purified by chromatographing over 300 grams of neutral alumina, the purified ester being eluted with benzene containing twenty percent chloroform. The solvent is removed by evaporation. The ester thus obtained is crystallized by trituration with ether and is recrystallized from benzene-petroleum ether (boiling point 30 to 60 degrees centigrade) mixture. The recrystallized methyl reserpate O-(3,5-dipropyl-4-allyloxybenzoate) melts at 203 to 204 degrees centigrade.

*Analysis.*—Calc'd for $C_{39}H_{50}N_2O_7$: C, 71.10; H, 7.65; N, 4.25. Found: C, 71.42; H, 7.35; N, 4.29.

*Example 5.—Methyl reserpate O-(2-methyl-3-ethyl-4-allyloxy-benzoate)*

Methyl reserpate is esterified with 2-methyl-3-ethyl-4-allyloxybenzoyl chloride according to the general procedure of Example 1 to produce methyl reserpate O-(2-methyl-3-ethyl-4-allyloxybenzoate).

*Example 6.—Methyl reserpate O-(2-methyl-5-isopropyl-4-allyloxybenzoate)*

According to the general procedure of Example 1, methyl reserpate is esterified with 2-methyl-5-isopropyl-4-allyloxybenzoyl chloride to produce methyl reserpate O-(2-methyl-5-isopropyl-4-allyloxybenzoate).

In the same manner as shown in Examples 1 through 6 other methyl reserpate O-(dialkyl-4-alkenoxybenzoates) are prepared from methyl reserpate and the appropriate acid chloride esterifying agent, including the following O-esters of methyl reserpate: 2,6-dimethyl-4-propenoxybenzoate, 2,6-dimethyl-4-(β-butenoxy)-benzoate, 2,6-dimethyl-4-(β-isobutenoxy)-benzoate, 2,6-diethyl-4-(β-secondary - butenoxy) - benzoate, 2,6-dibutyl-4-allyloxybenzoate, 3,5-dimethyl-4-allyloxybenzoate, 3,5-dimethyl-4-(α-butenoxy)-benzoate, 3,5-diethyl-4-allyloxybenzoate, 3,5-dihexyl-4-(γ-butenoxy)-benzoate, 3,5-dipropyl-4-(β-isobutenoxy)-benzoate, 2,3-dimethyl-4-allyloxybenzoate, 2-methyl-3-ethyl-(β-butenoxy)-benzoate, 2,3-diisobutyl-4-(β-isobutenoxy)-benzoate, 2-isopropyl-5-methyl-4-allyloxybenzoate, 2,5-dipropyl-4-allyloxybenzoate, 2,5-dimethyl-4-allyloxybenzoate, 2,5-diethyl-4-allyloxybenzoate, 2-methyl-5-isopropyl-4-propenoxybenzoate, and other 2,3-, 2,5-, 2,6-, and 3,5-dialkyl-4-alkenoxybenzoates. By substituting other alkyl reserpates, for example, ethyl reserpate, propyl reserpate, butyl reserpate, isobutyl reserpate, hexyl reserpate, etc. there are obtained the corresponding O-(dialkyl-4-alkenoxybenzoates) which have like utility.

Following the procedures of Examples 1 through 6, but substituting methyl deserpidate, methyl raunescate or methyl raujemidate for the methyl reserpate, there are prepared the corresponding O-(dialkyl-4-alkenoxybenzoate) esters of methyl deserpidate, methyl raunescate, and methyl raujemidate, respectively, wherein the ester radicals are those named previously in the description and examples, which esters are useful for the same purpose and employed in the same manner as the corresponding O-(dialkyl-4-alkenoxybenzoate) esters of methyl reserpate. The following examples are illustrative:

*Example 7.—Methyl deserpidate O-(3,5-dipropyl-4-allyloxybenzoate)*

Following the procedure of Example 1 using methyl deserpidate in place of methyl reserpate and 3,5-dipropyl-4-allyloxybenzoyl chloride as the dialkyl-4-alkenoxybenzoyl chloride, there is obtained methyl deserpidate O-(3,5-dipropyl-4-alloxybenzoate).

*Example 8.—Methyl raunescate O-(3,5-dipropyl-4-allyloxybenzoate)*

Following the procedure of Example 1 using methyl raunescate in place of methyl reserpate and 3,5-dipropyl-4-allyloxybenzoyl chloride as the dialkyl-4-alkenoxybenzoyl chloride, there is obtained methyl raunescate O-(3,5-dipropyl-4-alloyloxybenzoate).

*Example 9.—Methyl raujemidate O-(3,5-dipropyl-4-alloyloxybenzoate)*

Following the procedure of Example 1 using methyl raujemidate in place of methyl reserpate and 3,5-dipropyl-4-allyloxybenzoyl chloride as the dialkyl-4-alkenoxybenzoyl chloride, there is obtained methyl raujemidate O-(3,5-dipropyl-4-allyloxybenzoate).

In the same manner as shown in Examples 1 through 6 other dialkyl-4-alkenoxybenzoic acid esters of methyl deserpidate, methyl raunescate, and methyl raujemidate are prepared by reacting the latter with the appropriate acid chloride esterifying agent, including the following O-esters of methyl deserpidate, methyl raunescate and methyl raujemidate: 2,6-dimethyl-4-propenoxybenzoate, 2,6-dimethyl-4-($\beta$-butenoxy)-benzoate, 2,6-dimethyl-4-($\beta$-isobutenoxy)-benzoate, 2,6-diethyl-4-($\beta$-secondary-butenoxy)-benzoate, 2,6-dibutyl-4-allyloxybenzoate, 3,5-dimethyl-4-allyloxybenzoate, 3,5-dimethyl-4-($\alpha$-butenoxy)-benzoate, 3,5-diethyl-4-allyloxybenzoate, 3,5-dimethyl-4-($\alpha$-butenoxy)-benzoate, 3,5-dihexyl-4-($\gamma$-butenoxy)-benzoate, 3,5-dipropyl-4-($\beta$-isobutenoxy)-benzoate, 2,3-dimethyl-4-allyloxybenzoate, 2-methyl-3-ethyl-($\beta$-butenoxy)-benzoate, 2,3-diisobutyl-4-($\beta$-isobutenoxy)-benzoate, 2-isopropyl-5-methyl-4-allyloxy-benzoate, 2,5-dipropyl-4-allyloxybenzoate, 2,5-dimethyl-4-allyloxybenzoate, 2,5-diethyl-4-allyloxybenzoate, 2-methyl-5-isopropyl-4-propenoxybenzoate, and other 2,3-, 2,5-, 2,6-, and 3,5-dialkyl-4-alkenoxybenzoates. By substituting other alkyl deserpidates, alkyl raunescates, and alkyl raujemidates, for example, ethyl, propyl, butyl, isobutyl, and hexyl deserpidates, raunescates, and raujemidates there are obtained the corresponding O-(dialkyl-4-alkenoxybenzoates) which have like utility.

It is to be understood that the invention is not to be limited to the exact details of operation or exact compounds shown and described, as obvious modifications and equivalents will be apparent to one skilled in the art, and the invention is therefore to be limited only by the scope of the appended claims.

This application is a continuation-in-part of Serial Number 650,847, filed April 5, 1957, now abandoned.

We claim:
1. Lower-alkyl reserpate O-[di-(lower-alkyl)-4-(lower-alkenoxy)-benzoate].
2. Methyl reserpate O-[di-(lower-alkyl)-4-(lower-alkenoxy)-benzoate].
3. Methyl reserpate O-[2,3-di-(lower-alkyl)-4-(lower-alkenoxy)-benzoate].
4. Methyl reserpate O-[2,5-di-(lower-alkyl)-4-(lower-alkenoxy)-benzoate].
5. Methyl reserpate O-[2,6-di-(lower-alkyl)-4-(lower-alkenoxy)-benzoate].
6. Methyl reserpate O-[3,5-di-(lower-alkyl)-4-(lower-alkenoxy)-benzoate].
7. Methyl reserpate O-(2-methyl-3-ethyl-4-allyloxybenzoate).
8. Methyl reserpate O-(2-methyl-5-isopropyl-4-allyloxybenzoate).
9. Methyl reserpate O-(2,6-dimethyl-4-allyloxybenzoate).
10. Methyl reserpate O-[2-methyl-6-ethyl-4-($\beta$-butenoxy)-benzoate].
11. Methyl reserpate O-(3,5-dipropyl-4-allyloxybenzoate).

References Cited in the file of this patent

UNITED STATES PATENTS

| | | |
|---|---|---|
| 2,789,112 | Taylor | Apr. 16, 1957 |
| 2,883,386 | Szmuszkovicz | Apr. 21, 1959 |

FOREIGN PATENTS

| | | |
|---|---|---|
| 744,290 | Great Britain | Feb. 1, 1956 |

OTHER REFERENCES

Hosansky et al.: Jour. Am. Pharm. Assoc., vol. 44, No. 10, pp. 639–644 (1955).